United States Patent Office 3,740,379
Patented June 19, 1973

---

3,740,379
METHOD FOR INTRODUCING METAL CATIONS INTO LACTAM POLYMERS
Jan Sebenda and Rudolf Puffr, Prague, Czechoslovakia, assignors to The Polymer Corporation
No Drawing. Filed Jan. 8, 1971, Ser. No. 105,107
The portion of the term of the patent subsequent to June 27, 1989, has been disclaimed
Int. Cl. C08g 20/18
U.S. Cl. 260—78 L  6 Claims

ABSTRACT OF THE DISCLOSURE

Lactam polymers of modified properties are prepared by introducing metal cations into the lactam prior to polymerization in the form of complexes of these cations and the lactam.

---

The invention relates to a method for introducing metal cations into lactam polymers, and particularly to those lactam polymers polymerized by anionic processes which conveniently may be conducted below the melting point of the polymer. The lactams with which this invention is concerned are those having between 3 to 12 carbon atoms in the lactam ring.

Salts of polyvalent metals interact with the amide groups of polyamides, affect their crystallization properties and, consequently, some other properties of polyamides. By adding some polyvalent salts, the stability of the molecular weight of polyamides prepared by anionic polymerization can also be affected, so that it is desirable to find an optimum method for introducing cations into the polymer. An appropriate choice of the cation and its concentration will enable a considerable decrease in crystallinity to be attained. This method of reducing crystallinity has been described in our copending U.S. patent application Ser. No. 20,430 now U.S. Pat. No. 3,673,161, granted June 27, 1972. According to the aforementioned invention, lactams are polymerized by anionic catalysts, the salts of bi-, tri- or tetravalent cations being introduced into the initial reaction mixture or a partly polymerized mixture. For instance, the use of $CrCl_3$, $AlCl_3$, and $MgCl_2$ has been described. According to French Pat. 1,499,058, halides of metals are introduced into the initial reaction mixture, the effect of these compounds consisting of an increase in the polymerization rate.

The basic requirement of an anionic polymerization of lactams is an anhydrous system. However, most of the inorganic salts which are suited for the modification of polyamide are usually available in the form of hydrates. Both the preparation of anhydrous salts and the manipulation thereof with the necessary elimination of moisture are difficult in most cases. These drawbacks are removed by the present invention of a method for introducing polyvalent cations into the lactam polymers, according to which bi- and polyvalent metal cations, such as $Be^{2+}$, $Mg^{2+}$, $Ca^{2+}$, $Zn^{2+}$, $Sr^{2+}$, $Cd^{2+}$, $Ba^{2+}$, $Hg^{2+}$, $Al^{3+}$, $Sc^{3+}$, $In^{3+}$, $La^{3+}$, $Ti^{4+}$, $Ge^{4+}$, $Sn^{2+}$, $Sb^{5+}$, $Sb^{3+}$, $Pb^{2+}$, $Cr^{3+}$, $Mn^{2+}$, $Fe^{2+}$, $Fe^{3+}$, $Co^{2+}$, $Ni^{2+}$, $Cu^{2+}$, $Rh^{4+}$, $Pd^{4+}$, $Ir^{4+}$ and $Pt^{4+}$, are introduced into the initial polymerization mixture in the form of complexes of cations of the above metals with the corresponding monomeric lactams. The mixture thus obtained is then subjected to polymerization.

The suggested method for introducing cations into the lactam polymers has the advantage in that the aforementioned complexes are nonhygroscopic or essentially less hygroscopic than noncomplexed anhydrous salts. Moreover, the above complexes are much more readily dissolved in the monomeric lactam than the noncomplex anhydrous salts. These factors are important, particularly in the anionic polymerization of lactams, since in this way the possibility of introducing the undesired water into the polymerization system is reduced considerably. In this manner, higher polymerization rates and a better reproducibility of the processes of anionic polymerization and of the properties of the final polyamide can be attained.

The complexes can be introduced into the reaction mixture at any stage of its preparation, with advantage, however, prior to the addition of the catalysts. In the case of anionic polymerization, the complexes can be added after the initiator (i.e., strong base) has been dissolved. Upon the following addition of the complex, the polymerization is started by adding an activator, for example, isocyanate or acetyl caprolactam. In the hydrolytic polymerization initiated with water, amine salts, or with amino acids, the complexes can be added at any stage of preparation of the reaction mixture. In slower anionic or hydrolytic polymerizations of lactams, the complex can also be added to the polymerizing system, as long as its viscosity allows it.

The complexes of the above cations with the monomeric lactams can be prepared by known methods. The most common method of preparation of complexes containing lactams consists of the addition of a methanolic lactam solution after the dehydration of hydrates of the corresponding salts in 2,2-dimethoxy propane; the complex thus formed is precipitated with ether (cf. e.g. S. K. Mada and M. H. Denk, J. Inorg. Nucl. Chem. 27, 1049/1955). In this way, complexes of the type $$M^{n+} (lactam)_6 (ClO_4)_n$$

have been prepared with the lactam being pyrrolidone, piperidone and caprolactam, and M being $Ni^{2+}$, $Cr^{3+}$ and $Co^{2+}$. In the preparation of complexes, benzene solutions of salt hydrates can also be used, to which small quantities of acetone may be added in order to increase their solubility. During azeotropic dehydration in the presence of lactams, crystalline complexes are precipitated (C. L. Rollinson and R. C. White, Inorg. Chem. 1,281/1962). This method was used to prepare $Cr(caprolactam)_3Cl_3$, $Cr(caprolactam)_6(ClO_4)_3$, $Cu(caprolactam)_3Cl_2$ and $Cu(caprolactam)Cl_2$. From some anhydrous salts, complexes can be obtained directly by mixing the solution of the salt (mainly in methanol) with a solution or melt of lactam, followed in some cases by precipitation with ether. For example, by this method the following compounds were prepared: $Al(caprolactam)_6Cl_3$, $$Mg(caprolactam)_6(ClO_4)_2$$

$Ni(caprolactam)_6I_2, CO(caprolactam)_6/CO(SCN)_4/$, $Mn(caprolactam)_3Cl_2$, $Ba(caprolactam)_6(ClO_4)_2$ and $La(pyrrolidone)_6(NO_3)_3$.

The methods described above allow the preparation of the complexes of the aforementioned cations with the corresponding monomeric lactams. All of the complexes given in the examples were prepared by one of the methods described. The complexes thus formed are mainly compounds that crystallize readily, and the purification of which is much easier than purification and dehydration of simple salts. High purity of the compounds added, and particularly the absence of water, as well as their lower hygroscopicity, ensure a successful polymerization process of the lactams. This is true for both the hydrolytic polymerization as well as for the anionic polymerization in which the impurities affect considerably the course of polymerization and the final molecular weight of the polymer. In the latter case, the varying purity of the salts affects both the final degree of polymerization and the stability of the polymer towards thermal and oxidation degradation.

EXAMPLE 1

0.41 gram of $Cr(caprolactam)_3Cl_3$ (dried at 120° C. under vacuum 1 mm. Hg) was dissolved in the melt of 11 grams of caprolactam at 120° C. After addition of 0.36 gram of sodium caprolactam, the solution was heated at 200° C. for three hours and then left to cool freely. The greenish polymer thus obtained contains 8% water-extractable compounds and its degree of polymerization is 533. The crystallinity of the product is half the value of that of a polymer prepared in a similar manner without addition of the complex.

EXAMPLE 2

9.3 grams of $Mg(caprolactam)_6(ClO_4)_2$ (dried at room temperature for 24 hours under vacuum 1 mm. Hg) was dissolved in 16.3 grams of caprolactam at 100° C. After addition of 0.085 gram of sodium caprolactam and 0.0888 gram of tetraacetyl hexamethylene diamine, the mixture was heated to 175° C. for two hours. The polymer contains 10% water-extractables, its degree of polymerization is 217, and its crystallinity is 15%. The crystallinity of a polycaprolactam polymerized similarly, but without addition of the complex, is 60%.

EXAMPLE 3

1 gram of sodium caprolactam and 1.56 grams of Al-$(caprolactam)_6Cl_3$ (dried at 80° C. under vacuum 1 mm. Hg for one hour) were dissolved in 24 grams of caprolactam at 100° C. After heating to 240° C. for one hour, a polymer was obtained containing 12% water-extractables. The polymer has a degree of polymerization of 110 and its crystallinity is 25%.

EXAMPLE 4

A mixture of 12.7 grams of enantolactam, 1.1 grams $Co(enantolactam)_3(SCN)_2$, and 0.3 gram of $\omega$-aminoenantic acid were heated in a sealed ampoule to 240° C. for fifteen hours under nitrogen atmosphere. The polymer thus obtained has a crystallinity of 18% and contains less than 2% of monomeric lactam.

EXAMPLE 5

0.24 grams of $Cr(capryllactam)_3(ClO_4)_3$, 0.114 gram of sodium capryllactam and 0.015 gram of N-benzoyl-capryllactam were dissolved in 2.8 grams of capryllactam at 80° C. The solution was heated to 170° C. for thirty minutes. The obtained high molecular weight polymer, whose content of water-extractables is 1%, has a crystallinity of 23%.

EXAMPLE 6

In 11.3 grams of caprolactam, 0.2 gram of $Cr(caprolactam)_3Cl_3$, 0.2 gram of sodium caprolactam, and 0.065 gram of N-benzoylcaprolactam were gradually dissolved at 100° C. An equilibrium polymerizate having a degree of polymerization of 254 was obtained by polymerization at 200° C. for 1.1 hours. At a polymerization time of three hours and ten hours, the polymerization degrees were 262 and 258 respectively. If caprolactam was polymerized without adding the chromic complex, the polymerization degree dropped by 20% within three hours.

EXAMPLE 7

12 grams of $Cr(laurinolactam)_3Cl_3$ was dissolved in 200 grams of laurinolactam at 200° C. After cooling to room temperature, the solidified solution was crushed and mixed with 1.8 grams of adipic acid. The mixture thus obtained was heated to 280° C. for 150 hours under inert atmosphere; in this way, it was converted to a polymer containing 1.8% monomer.

EXAMPLE 8

1.2 grams of $Mn(4-phenyl-2-acetidinone)_2(C_6H_5SO_3)_2$ was dissolved in 20 grams of 4-phenyl-2-acetidinone. After solidification, the product was crushed and mixed with 1.95 grams of the sodium salt of N-ethyl-2-methyl-3-oxohexanamide under inert atmosphere. The mixture thus obtained was polymerized at 195° C. for three hours.

We claim:

1. A method for controlling the crystallinity of lactam polymers polymerized by anionic polymerization processes from lactams having three to twelve carbon atoms in the ring by introducing polyvalent metal cations selected from the group consisting of $Be^{2+}$, $Mg^{2+}$, $Ca^{2+}$, $Zn^{2+}$, $Sr^{2+}$, $Cd^{2+}$, $Ba^{2+}$, $Hg^{2+}$, $Al^{3+}$, $Sc^{3+}$, $In^{3+}$, $La^{3+}$, $Ti^{4+}$, $Ge^{4+}$, $Sn^{2+}$, $Sb^{5+}$, $Sb^{3+}$, $Pb^{2+}$, $Cr^{3+}$, $Mn^{2+}$, $Fe^{2+}$, $Fe^{3+}$, $CO^{2+}$, $Ni^{2+}$, $Cu^{2+}$, $Rh^{4+}$, $Pd^{4+}$, $Ir^{4+}$ and $Pt^{4+}$, which comprises first, reacting salts of the polyvalent metal cations with a lactam to form a metal salt-lactam complex; second, adding the complex to a reactive mixture of the lactam; and third, polymerizing the reactive mixture.

2. A method according to claim 1 wherein the complex is dissolved in molten monomeric lactam, initiators and activators are added to the mixture, and the mixture is then subjected to polymerization.

3. A method according to claim 1 wherein the complex is dissolved in molten monomeric lactam, the mixture is crushed after solidification, and after granulation is transformed into a polymer by methods similar to those applied to the monomeric lactam.

4. A method according to claim 1 wherein the mixture is polymerized by anionic polymerization.

5. A method according to claim 4 wherein the polymerization is conducted below the melting point of the lactam polymers.

6. A method according to claim 1 wherein the polyvalent metal cations are complexed with anions which are chloride, perchlorate, nitrate or thiocyanate.

References Cited

UNITED STATES PATENTS

| | | | |
|---|---|---|---|
| 2,884,414 | 4/1959 | Indest et al. | 260—239.3 |
| 3,214,414 | 10/1965 | Waltersperger | 260—78 L |
| 3,216,976 | 11/1965 | Schwartz et al. | 260—78 L |
| 3,673,161 | 6/1972 | Sebenda et al. | 260—78 L |
| 2,960,489 | 11/1960 | Gabler et al. | 260—78 L |
| 3,309,343 | 3/1967 | Darnell et al. | 260—78 L |
| 3,425,986 | 2/1969 | Markert | 260—78 L |
| 3,498,956 | 3/1970 | Birkner | 260—78 L |

WILLIAM H. SHORT, Primary Examiner

L. M. PHYNES, Assistant Examiner

U.S. Cl. X.R.

260—78 P